United States Patent
Parizy et al.

(10) Patent No.: US 11,030,252 B2
(45) Date of Patent: Jun. 8, 2021

(54) EFFECTIVE EXTRACTION OF INFORMATION ON TIME-VARYING USER INTEREST

(71) Applicant: FUJITSU LIMITED, Kawasaki (JP)

(72) Inventors: Matthieu Parizy, Meguro (JP); Tatsuya Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 299 days.

(21) Appl. No.: 16/024,944

(22) Filed: Jul. 2, 2018

(65) Prior Publication Data
US 2019/0026391 A1    Jan. 24, 2019

(30) Foreign Application Priority Data
Jul. 18, 2017  (JP) .................................. 2017-139098

(51) Int. Cl.
| | | |
|---|---|---|
| G06F 16/903 | (2019.01) | |
| G06F 16/2458 | (2019.01) | |
| G06N 7/00 | (2006.01) | |
| G06Q 30/02 | (2012.01) | |
| G06N 5/02 | (2006.01) | |

(52) U.S. Cl.
CPC .... G06F 16/90335 (2019.01); G06F 16/2477 (2019.01); G06N 5/022 (2013.01); G06N 7/005 (2013.01); G06Q 30/0269 (2013.01)

(58) Field of Classification Search
CPC ............................ G06F 16/219; G06F 16/9038
See application file for complete search history.

(56) References Cited

U.S. PATENT DOCUMENTS

| | | | |
|---|---|---|---|
| 2007/0028256 A1 | 2/2007 | Azami | |
| 2010/0250341 A1* | 9/2010 | Hauser | G06Q 30/02 707/769 |
| 2011/0258664 A1* | 10/2011 | Kuo | H04N 21/44204 725/46 |
| 2015/0220998 A1 | 8/2015 | Futa et al. | |
| 2015/0370818 A1* | 12/2015 | Des Jardins | G06F 16/435 707/734 |
| 2018/0219759 A1* | 8/2018 | Brown | H04L 67/26 |

FOREIGN PATENT DOCUMENTS

| | | |
|---|---|---|
| JP | 2006-338581 | 12/2006 |
| JP | 2007-60626 A | 3/2007 |
| JP | 2010-128675 A | 6/2010 |
| WO | 2014/064940 | 5/2014 |

OTHER PUBLICATIONS

Japanese Office Action dated Mar. 23, 2021 for corresponding Japanese Patent Application No. 2017-139098, with English Translation, 9 pages.

* cited by examiner

*Primary Examiner* — Ken Hoang
(74) *Attorney, Agent, or Firm* — Fujitsu Patent Center (57) ABSTRACT

An apparatus sets, for a user, a time-width indicating a period of time which precedes a current time and for which a usage history of the user is to be acquired, and extracts an interesting matter of the user from the usage history acquired within the set time-width. The apparatus provides help information obtained based on the extracted interesting matter to the user to acquire a result of an operation that is performed by the user in response to provision of the help information, where the time-width for the user is set based on the acquired result of the operation by the user.

12 Claims, 9 Drawing Sheets

EFFECTIVE EXTRACTION OF INFORMATION ON TIME-VARYING USER INTEREST

CROSS-REFERENCE TO RELATED APPLICATION

This application is based upon and claims the benefit of priority of the prior Japanese Patent Application No. 2017-139098, filed on Jul. 18, 2017, the entire contents of which are incorporated herein by reference.

FIELD

The embodiments discussed herein are related to effective extraction of information on time-varying user interest.

BACKGROUND

Systems have hitherto been proposed in which the characters of users (personas) are analyzed from histories of the users and information matched with the users is extracted and provided.

As technologies in related art to analyze the characters of users, for example, a message apparatus is known in which analysis of the characters of persons in a certain user group who uses the message server, which is based on character-of-person data, is instructed and the result of the analysis of the characters of the persons is displayed (refer to Japanese Laid-open Patent Publication No. 2006-338581). In addition, an advertisement distribution method is known in which usage information is collected from household electrical appliances of users, users who are supposed to buy goods are extracted based on the collected usage information, and advertisement is transmitted to the extracted users (refer to International Publication Pamphlet No. WO2014/64940).

SUMMARY

According to an aspect of the invention, an apparatus sets, for a user, a time-width indicating a period of time which precedes a current time and for which a usage history of the user is to be acquired, and extracts an interesting matter of the user from the usage history acquired within the set time-width. The apparatus provides help information obtained based on the extracted interesting matter to the user to acquire a result of an operation that is performed by the user in response to provision of the help information, where the time-width for the user is set based on the acquired result of the operation by the user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Each user has multiple interesting matters and the matter which the user has the greatest concern is varied with time. For example, the matter which the user has the greatest concern in a mediate to long term history may not coincide with the matter which the user has the greatest concern in a shorter term history.

Accordingly, a difference may arise between the interesting matters analyzed in the technologies in the related art and the current interesting matters of the user. As a result, there is a problem in that the accuracy of information to be provided to the user may be decreased in the technologies in the related art.

In one aspect, the present disclosure provides an information extraction apparatus, an information extraction program, and an information extraction method capable of accurately extracting interesting matters of a user.

An information extraction apparatus, an information extraction program, and an information extraction method according to embodiments will herein be described with reference to the drawings. The same reference numerals are used to identify the components having the same functions in the embodiments. A duplicated description of such components is omitted herein. The information extraction apparatus, the information extraction program, and the information extraction method described below in the embodiments are only examples and are not intended to limit the embodiments. The embodiments described below may be appropriately combined within a consistent range.

Figure 1:
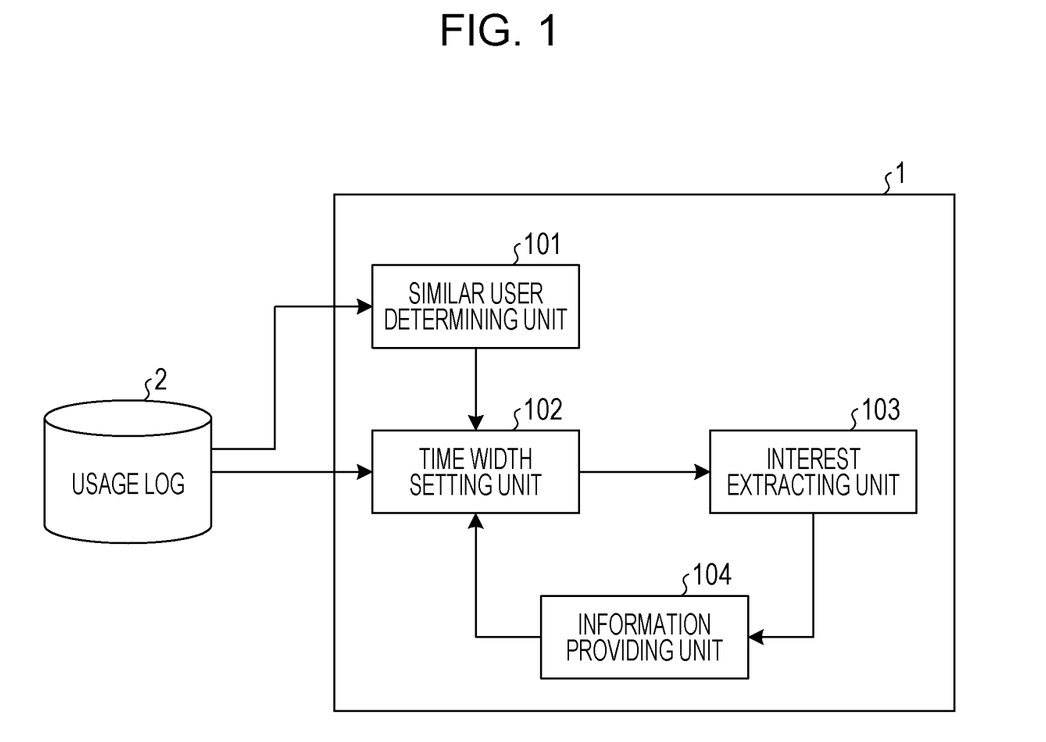
FIG. 1 is a block diagram illustrating an exemplary configuration of an information extraction apparatus according to an embodiment.

FIG. 1 is a block diagram illustrating an exemplary configuration of an information extraction apparatus according to an embodiment. An information extraction apparatus 1 illustrated in FIG. 1 is, for example, an information processing apparatus, such as a personal computer (PC). Referring to FIG. 1, the information extraction apparatus 1 includes a similar user determining unit 101, a time width setting unit 102, an interest extracting unit 103, and an information providing unit 104.

The information extraction apparatus 1 refers to a usage log 2 in which a usage history of each user is recorded to extract an interesting matter of each user in the usage history. The information extraction apparatus 1 provides information based on the extracted interesting matter to the user by displaying the information on a screen. The information to be provided to the user includes help information matched with the interesting matter in a help system of a tool and recommended information for recommending an item matched with the interesting matter. The user is capable of acquiring a variety of information matched with his/her interest in the above manner.

The usage log 2 is a log file in which the usage history (including the content of operations and the operation dates and times) of various tools is stored, for example, for each user identifier (ID), which identifies each user. In other words, the usage log 2 is an example of the usage history of the user.

The various tools the usage histories of which are stored in the usage log 2 include, for example, a Web browser and a business application. For example, in the case of the Web browser, the content of operations including Web sites accessed with the Web browser and the content of search in search sites is stored in the usage log 2 along with the operation dates and times. In the case of the business application, the content of operations including search and selection of items in the business application, confirmation of the content, and re-selection of an item that was selected is stored in the usage log 2 along with the operation dates and times.

The similar user determining unit 101 compares the usage histories of the respective users in the usage log 2 with each other to determine whether each user has the usage history similar to that of a target user. For example, the similar user determining unit 101 compares the usage history of the target user in the usage log 2 with the usage history of another user therein to acquire the degree of similarity between the usage histories. Then, the similar user determining unit 101 determines the user the calculated degree of similarity of whom is higher than or equal to a predetermined threshold value to be a similar user. The similar user determining unit 101 supplies the result of the determination to the time width setting unit 102.

The time width setting unit 102 sets a time width from the current time, within which the usage history of the target user is acquired from the usage log 2. The time-width indicates a period of time which precedes a current time and for which a usage history of each user is to be acquired. The time width setting unit 102 acquires the usage history within the set time width from the current time, based on information about the dates and times in the usage history, from the usage history of the target user stored in the usage log 2. The time width setting unit 102 supplies the acquired usage history of the target user to the interest extracting unit 103.

The interest extracting unit 103 extracts interesting matters of the user in the usage history, based on the usage history of the user, which is acquired from the usage log 2 within the time width set by the time width setting unit 102. For example, the interest extracting unit 103 calculates an interest group probability indicating the degree of interest of the user, for each of multiple predetermined interesting matters, based on the usage history of the user acquired from the usage log 2. Then, the interest extracting unit 103 extracts the interesting matter the interest group probability of which is higher than or equal to a predetermined threshold value in the decrement order of the calculated interest group probabilities. Then, the interest extracting unit 103 supplies the extracted interesting matters to the information providing unit 104.

Figure 2:
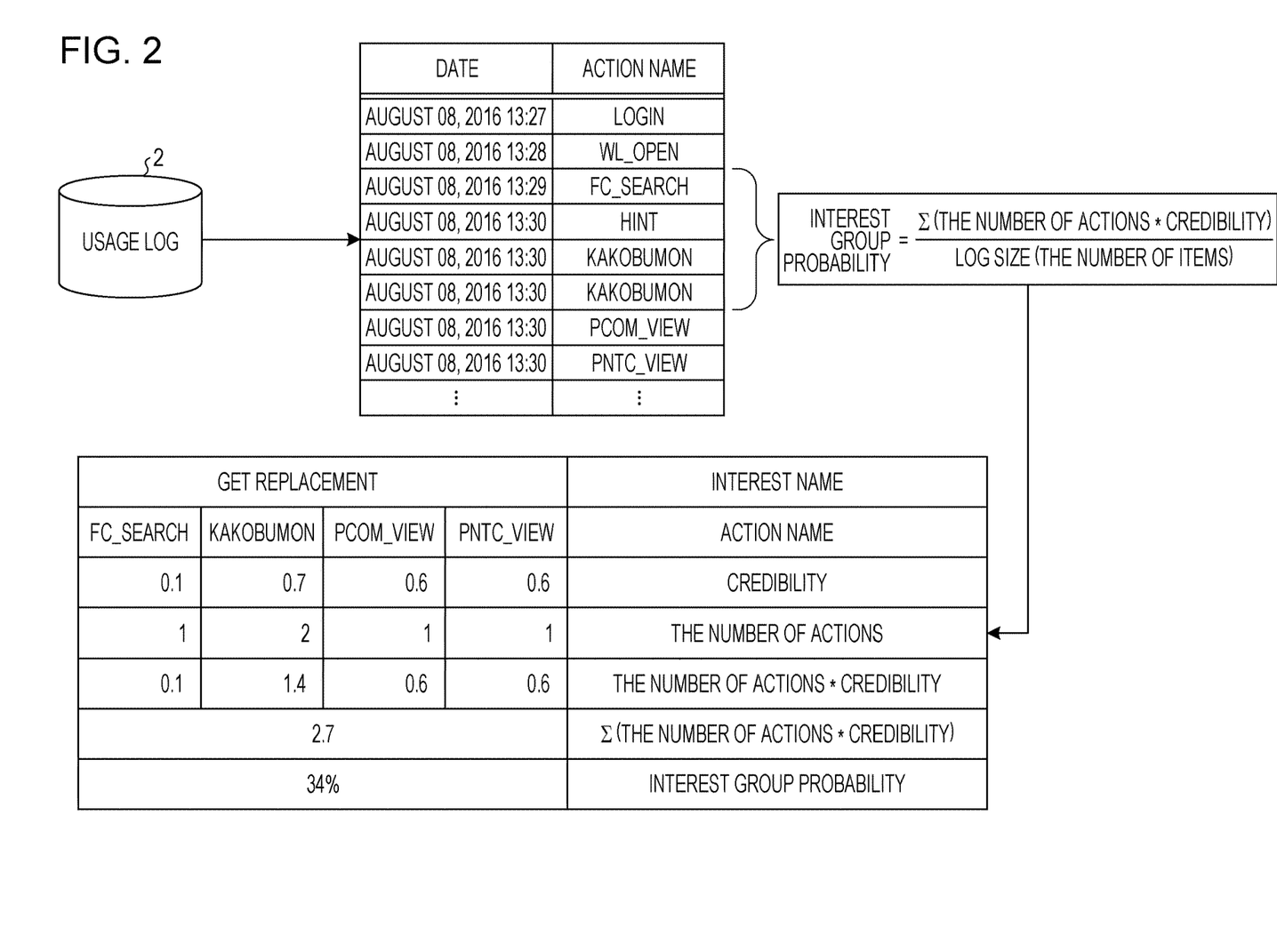
FIG. 2 is a diagram for describing an example of how to calculate an interest group probability.
Figure 3:
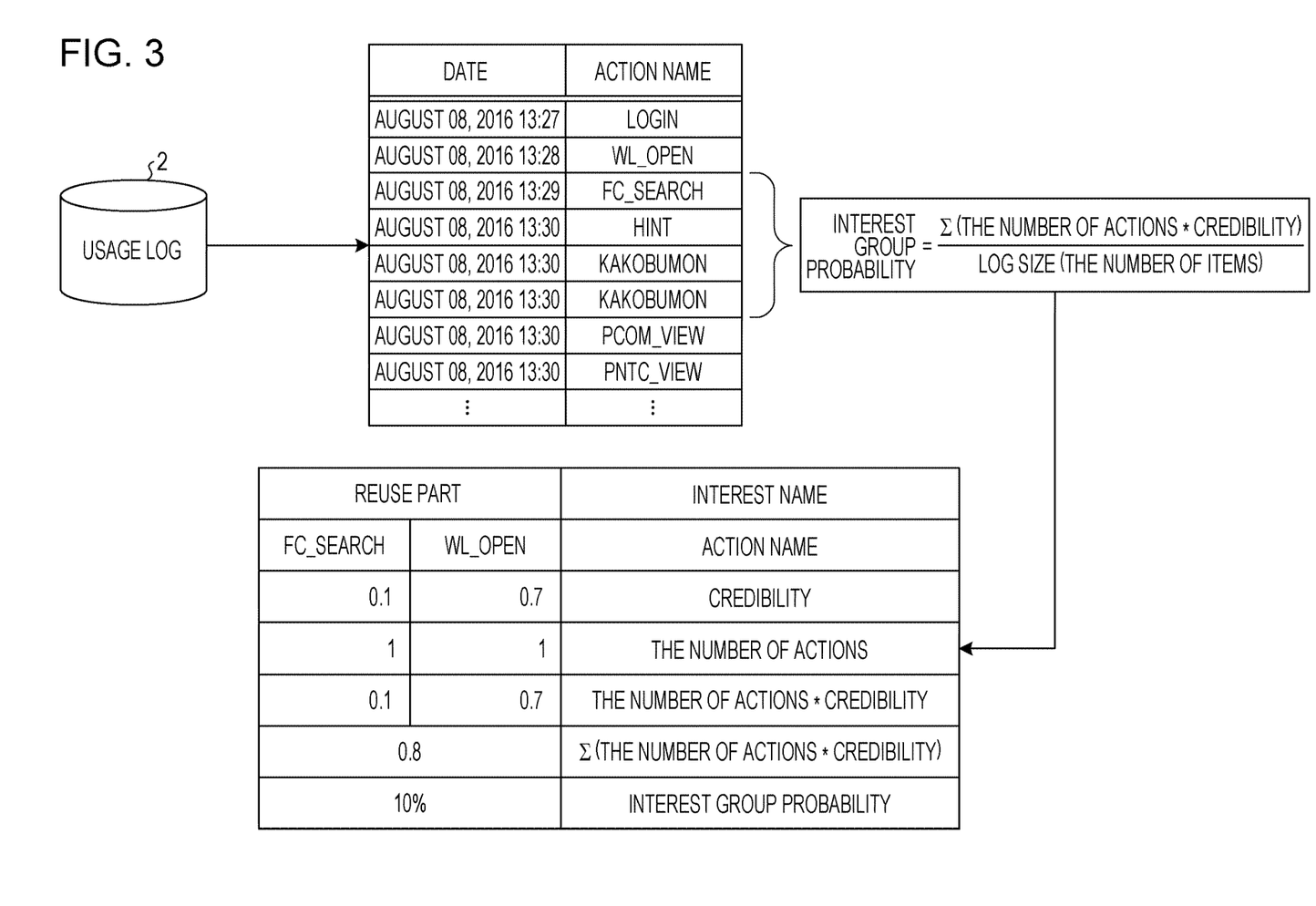
FIG. 3 is a diagram for describing another example of how to calculate the interest group probability.

How to calculate the interest group probability will now be described in detail with reference to FIG. 2 and FIG. 3. FIG. 2 and FIG. 3 are explanatory diagrams for describing examples of calculation of the interest group probability. For example, FIG. 2 is a diagram for describing an example of how to calculate the interest group probability for an interesting matter having an interest name of "Get replacement". FIG. 3 is a diagram for describing an example of how to calculate the interest group probability for an interesting matter having an interest name of "Reuse part".

As illustrated in FIG. 2, actions (the content of operations) supposed to be performed by the user having an interesting matter and the credibility of each action for the interesting matter are set in advance for the interesting matter, such as "Get replacement".

For example, in the case of "Get replacement", an operation to search for a part ("FC_SEARCH") and an operation to select a past part ("KAKOBUMON") are supposed to be the actions to be performed by the user having the interesting matter "Get replacement". Accordingly, the actions, such as "FC_SEARCH", "KAKOBUMON", "PCOM_VIEW", and "PNTC_VIEW", which are supposed to be performed by the user having the interesting matter, are set in advance for the interesting matter "Get replacement".

In addition, different actions have different degrees of trust for the interesting matter. For example, in the case of "Get replacement", the operation to select a past part ("KAKOBUMON") has a probability of being performed higher than that of the operation to search for a part ("FC_SEARCH"). In other words, "KAKOBUMON" has a credibility higher than that of "FC_SEARCH". The value of the credibility indicating the degree of trust is set in advance for each action so that the different degrees of trust are reflected.

In the calculation of the interest group probability of "Get replacement", the interest extracting unit 103 counts the number of the actions of each action that is set in advance for the interest matter "Get replacement", based on the usage history of the user acquired from the usage log 2. Then, the interest extracting unit 103 multiplies the calculated number of the actions by the value of the credibility that is set in advance to calculate a calculation value (the number of actions*credibility) of each action. Then, the interest extracting unit 103 divides the sum of the calculation values ($\Sigma$(the number of actions*credibility) by the log size (the number of cases) acquired from the usage log 2 to calculate the interest group probability as the probability of the user having the interesting matter "Get replacement".

Similarly, as illustrated in FIG. 3, in the case of "Reuse part", for example, the operation to search for a part ("FC_SEARCH") and an operation to confirm a past part ("WL_OPEN") are supposed to be the actions to be performed by the user having the interesting matter "Reuse part". Accordingly, these actions and the value of the credibility indicating the degree of trust of each action are set in advance for the interesting matter "Reuse part".

In the calculation of the interest group probability of "Reuse part", the interest extracting unit 103 counts the number of the actions of each action that is set in advance for the interest matter "Reuse part", based on the usage history of the user acquired from the usage log 2. Then, the interest extracting unit 103 multiplies the calculated number of the actions by the value of the credibility that is set in advance to calculate a calculation value (the number of actions*credibility) of each action. Then, the interest extracting unit 103 divides the sum of the calculation values ($\Sigma$(the number of actions*credibility) by the log size (the number of cases) acquired from the usage log 2 to calculate the interest group probability as the probability of the user having the interesting matter "Reuse part". As described above, the interest extracting unit 103 calculates the interest group probability for each of the multiple interesting matters and extracts the interesting matter based on the calculated interest group probability.

The information providing unit 104 provides information based on the interesting matter extracted by the interest extracting unit 103 to the user. The information is provided to the user through screen display using a display unit (not illustrated) such as a display or audio output using an audio output unit (not illustrated). For example, the information providing unit 104 is a help system that provides help information about a tool (such as a business application) matched with the interesting matter of the user or a recommendation system that presents a recommended item matched with the interesting matter of the user. The information providing unit 104 provides the information, such as the help information or the recommended item, matched with the interesting matter of the user to the user with reference to a database in which the pieces of information to be provided in association with the interesting matters are stored in advance.

In addition, the information providing unit 104 acquires a result of an operation which is performed by the user via an input unit (not illustrated), such as a keyboard or a mouse, in response to the provision of the information based on the interesting matter extracted by the interest extracting unit 103 to the user. For example, the information providing unit 104 acquires an operation to close a window on which the provided information is displayed or a click operation to confirm the provided information. Then, the information providing unit 104 records the result of the operation by the user, which is acquired in response to the provision of the information based on the extracted interesting matter, as a result of confirmation of the provided information.

The time width setting unit 102 sets a time width (a time span) used for the acquisition of the usage history from the usage log 2, based on the result of confirmation recorded by the information providing unit 104, that is, the result of the operation by the user, which is acquired in response to the provision of the information based on the interesting matter extracted by the interest extracting unit 103 to the user.

For example, when the information provided to the user by the information providing unit 104 is information useful for the user, that is, when appropriate information provision is performed, the result of an expected operation, such as the click operation to confirm the provided information, may be acquired. For example, the result of an operation expected to have the effect of help may be acquired in response to the provision of the help information in the help system. In contrast, when appropriate information provision is not performed, for example, the operation to close the window on which the provided information is displayed is performed and the result of an expected operation, such as the click operation to confirm the provided information, is not acquired.

Accordingly, when the result of an expected operation is acquired, there is a small difference between the interesting matter extracted based on the usage history acquired from the usage log 2 within the set time width and the interesting matter which the user actually has, and it is estimated that appropriate information provision is performed based on the interesting matter. Accordingly, when the result of an expected operation is acquired, the time width setting unit 102 keeps the time width that is set.

In contrast, when the result of an expected operation is not acquired, there is a large difference between the interesting matter extracted based on the usage history acquired from the usage log 2 within the set time width and the interesting matter which the user actually has, and it is estimated that appropriate information provision is not performed. Accordingly, when the result of an expected operation is not acquired, the time width setting unit 102 adjusts the time width that is set to another time width.

More specifically, the time width setting unit 102 sets time widths that are sequentially increased from an initial value, and determines whether the interesting matter that is extracted with the current time width being set is different from the interesting matter that is extracted with the previous time width being set. Then, for a different time width for which the extracted interesting matter is made different, the time width setting unit 102 determines whether the result of an operation that is performed by the user in response to the information provision based on the different interesting matter meets a predetermined condition. When the result of an operation by the user meets the predetermined condition, for example, when the result of an operation by the user is the click operation to confirm the provided information, the time width setting unit 102 sets the different time width as a time width that will be subsequently used.

Figure 4:
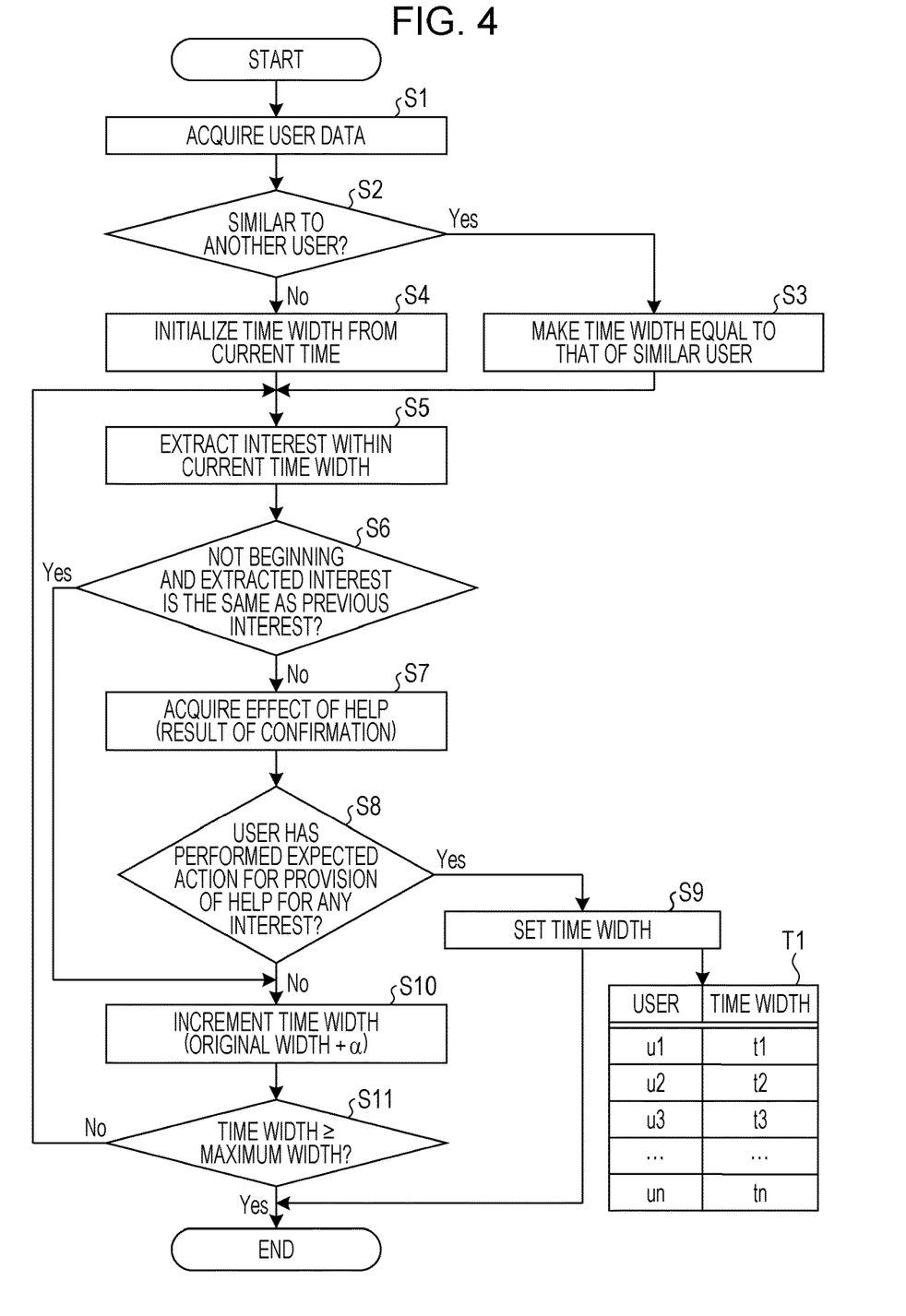
FIG. 4 is a flowchart illustrating an exemplary process to set a time width.

The setting of a time width in the time width setting unit 102 will now be described. FIG. 4 is a flowchart illustrating an exemplary process to set the time width. Referring to FIG. 4, upon start of the process, in Step S1, the information extraction apparatus 1 acquires data about the target user with reference to the usage log 2. In Step S2, the similar user determining unit 101 compares the usage histories of the respective users in the usage log 2 with each other to determine whether the usage history of the target user is similar to that of another user.

When the usage history of the target user is similar to that of another user (YES in Step S2), the process goes to Step S3. In Step S3, the time width setting unit 102 refers to a time width table T1 in which the time width set for each user is stored to make the time width of the target user equal to that of the similar user determined to be similar to the target user in the usage history.

When the usage history of the target user is not similar to that of another user (NO in Step S2), the process goes to Step S4. In Step S4, the time width setting unit 102 initializes the time width from the current time to the initial value that is set in advance.

In Step S5, the interest extracting unit 103 extracts the interest (the interesting matter) by using the time width set in Step S3 or S4 as the current time width. Step S5 to S11 will be repeatedly performed at a predetermined time interval (for example, every one day).

In Step S6, the time width setting unit 102 determines whether it is not the beginning of the process and the interest (the interesting matter) is the same as the interest (the interesting matter) extracted in the previous loop. For example, when the order of arrangement is the same as that of the extracted multiple interesting matters, the time width setting unit 102 determines that the extracted interest is the same as the interest extracted in the previous loop. When multiple different interesting matters are extracted or the order of arrangement is different from that of the extracted multiple interesting matters, the time width setting unit 102 determines that the extracted interest is different from the interest extracted in the previous loop.

When the interest (the interesting matter) is the same as the interest (the interesting matter) extracted in the previous loop (YES in Step S6), the process goes to Step S10. When the interest (the interesting matter) is different from the interest (the interesting matter) extracted in the previous loop (NO in Step S6), the process goes to Step S7. In Step S7, the time width setting unit 102 acquires the effect of help (the result of confirmation recorded by the information providing unit 104).

In Step S8, the time width setting unit 102 determines whether the user has performed an expected action (operation) for the provision of help (information provision) for any of the extracted interests (interesting matters), based on the acquired result of confirmation. For example, when the user has performed an expected operation, such as the click operation to confirm the provided information, the time width setting unit 102 makes affirmative determination. The time width setting unit 102 otherwise makes negative determination.

When the user has performed an expected operation (YES in Step S8), the process goes to Step S9. In Step S9, the time width setting unit 102 sets, in the time width table T1, the time width in the current loop as the time width of the target user. Then, the process illustrated in FIG. 4 is terminated.

When the user has not performed an expected operation (NO in Step S8), the process goes to Step S10. In Step S10, the time width setting unit 102 increments the time width (the time width in the current loop+predetermined value ($\alpha$)). In Step S11, the time width setting unit 102 determines whether the incremented time width is greater than or equal to a predetermined maximum value (the time width≥the maximum value). When the time width is not greater than or equal to the predetermined maximum value (NO in Set S11), the process goes back to Step S5. When the time width is greater than or equal to the predetermined maximum value (YES in Set S11), the process illustrated in FIG. 4 is terminated.

Figure 5:
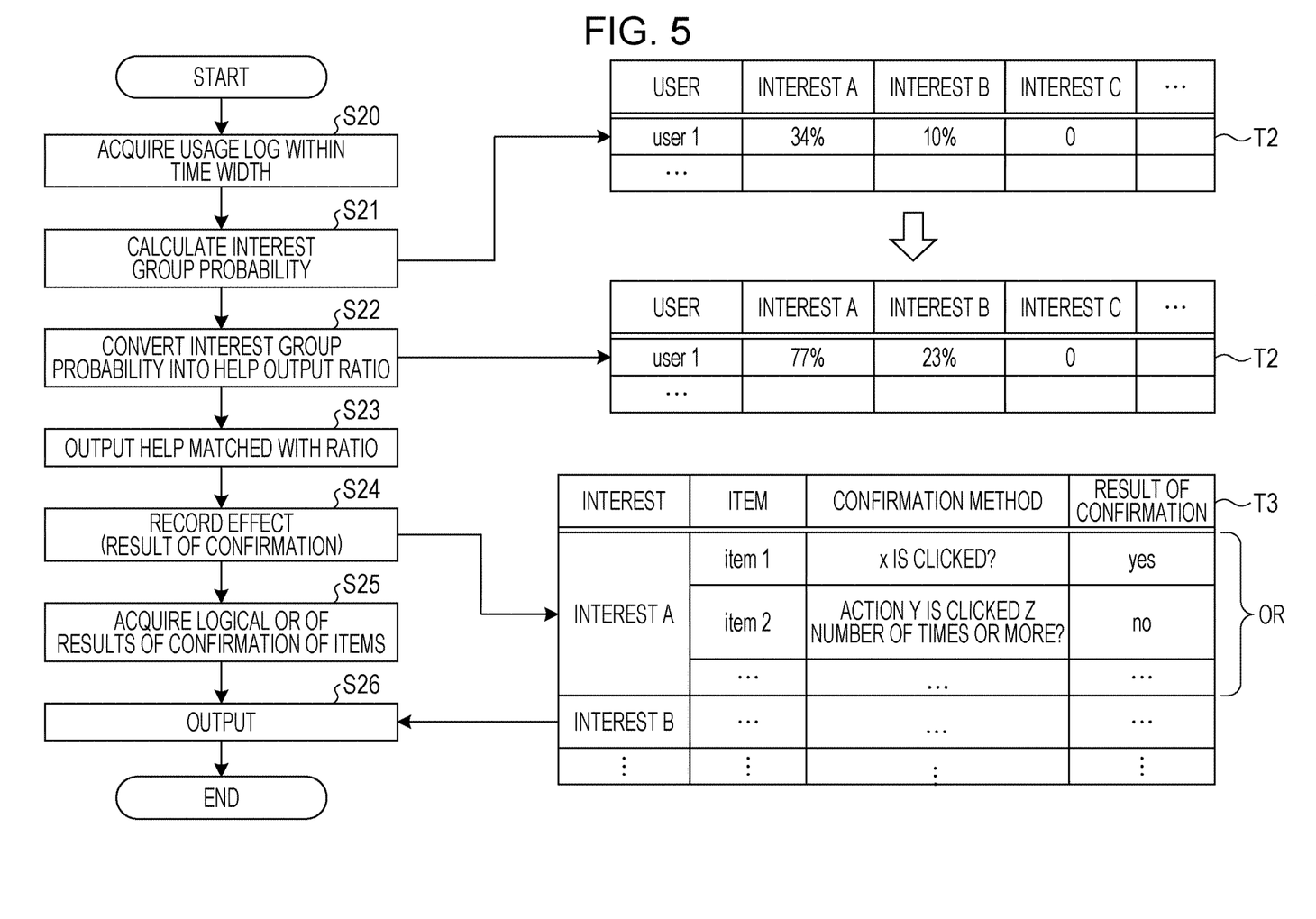
FIG. 5 is a flowchart illustrating an exemplary process to output a help in accordance with an interest.

A process to output a help in accordance with an interest will now be described in detail as an example of the information provision to the user. FIG. 5 is a flowchart illustrating an exemplary process to output a help in accordance with an interest.

Referring to FIG. 5, upon start of the process, in Step S20, the interest extracting unit 103 acquires the usage log 2 within the time width set by the time width setting unit 102 for the target user.

In Step S21, the interest extracting unit 103 calculates an interest group probability for each of the multiple predetermined interesting matters (an interest A, an interest B, an interest C, . . . ), based on the acquired usage log 2. The interest extracting unit 103 stores the interest group probability for each of the calculated multiple interesting matters, in an interest table T2. Here, the interest group probability indicates a degree of interest of each of the interesting matters for a user.

In Step S22, the information providing unit 104 converts the interest group probability of each of the multiple interesting matters into a help output ratio of each interesting matter with reference to the interest table T2. For example, the information providing unit 104 converts the interest group probability of each interesting matter, considering the total interest group probability of the extracted interest matters as 100%. For example, when the interests A and B are extracted, the interest A is 34%, and the interest B is 10%, the ratio of the interest A is 34/(34+10)=77.2% and the ratio of the interest B is 10/(34+10)=22.7%.

In Step S23, the information providing unit 104 outputs a help matched with the help output ratio of each interesting matter to provide information to the user. For example, when the ratio of the interest A is 77% and the ratio of the interest B is 23%, the information providing unit 104 provides pieces of help information to the user having the interest A at the ratio of 77%. In addition, the information providing unit 104 provides pieces of help information to the user having the interest B at the ratio of 23%.

In Step S24, the information providing unit 104 acquires the result of the operation performed in response to the provision of the information based on the interesting matter to the user, and records (stores) the result of the operation as an effect (the result of confirmation) in a confirmation result table T3. For example, when the information about the interest A is provided, the information providing unit 104 records the result of confirmation for each confirmation method of the interest A in the confirmation result table T3.

In Step S25, the information providing unit 104 acquires a logical OR of the results of confirmation of items in the confirmation result table T3. In Step S26, the information providing unit 104 outputs the acquired data to the time width setting unit 102 as the result of confirmation recorded by the information providing unit 104.

Figure 6:
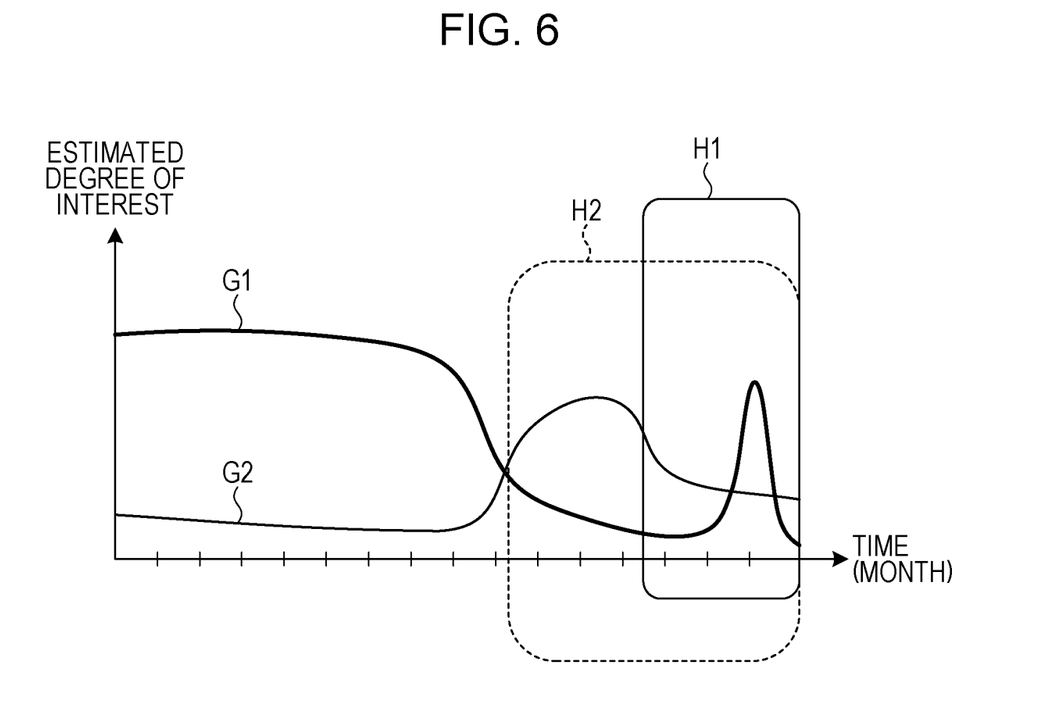
FIG. 6 is an explanatory diagram exemplifying the transition of interests and time widths.

FIG. 6 is an explanatory diagram exemplifying the transition of interests and time widths. Graphs G1 and G2 in the diagram in FIG. 6 illustrate estimated degrees of interest in different interesting matters of a user. The right ends of the graphs G1 and G2 indicate the current time. The interest of the graph G2 is higher than the interest of the graph G1 at the current time.

If the usage history is acquired from the usage log 2 within a time width H1, as illustrated in FIG. 6, a long period during which the graph G1 is higher than the graph G2 is included in the time width H1. Accordingly, the information (for example, a help) based on the graph G1 is provided to the user.

Figure 7:
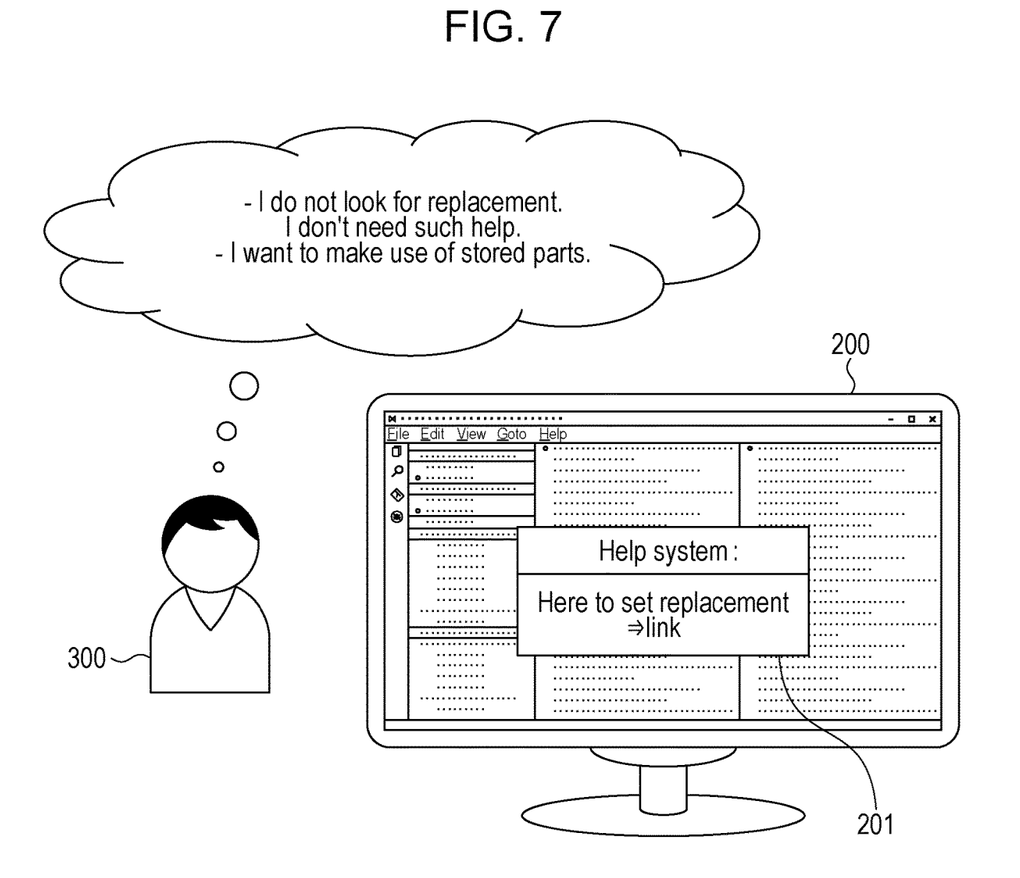
FIG. 7 is an explanatory diagram for describing an exemplary help output.

FIG. 7 is an explanatory diagram for describing an exemplary help output. For example, as illustrated in FIG. 7, a help screen 201 based on the graph G1 is displayed for a user 300 in a display unit 200. However, the user 300 has an interest of the graph G2 higher than that of the graph G1 at the current time. Accordingly, the user 300 recognizes that the help screen 201 is not matched with his/her interest. In such a case, the user 300 does not perform, for example, the click operation to confirm the help screen 201 and performs another operation. Accordingly, the information extraction apparatus 1 sets a time width H2 longer than the time width H1 in the next loop.

When the usage history is acquired from the usage log 2 within the time width H2, the graph G2 is higher than the graph G1 for a period longer than the period during which the graph G1 is higher than the graph G2. Accordingly, the information (for example, a help) based on the graph G2 is provided to the user.

Figure 8:
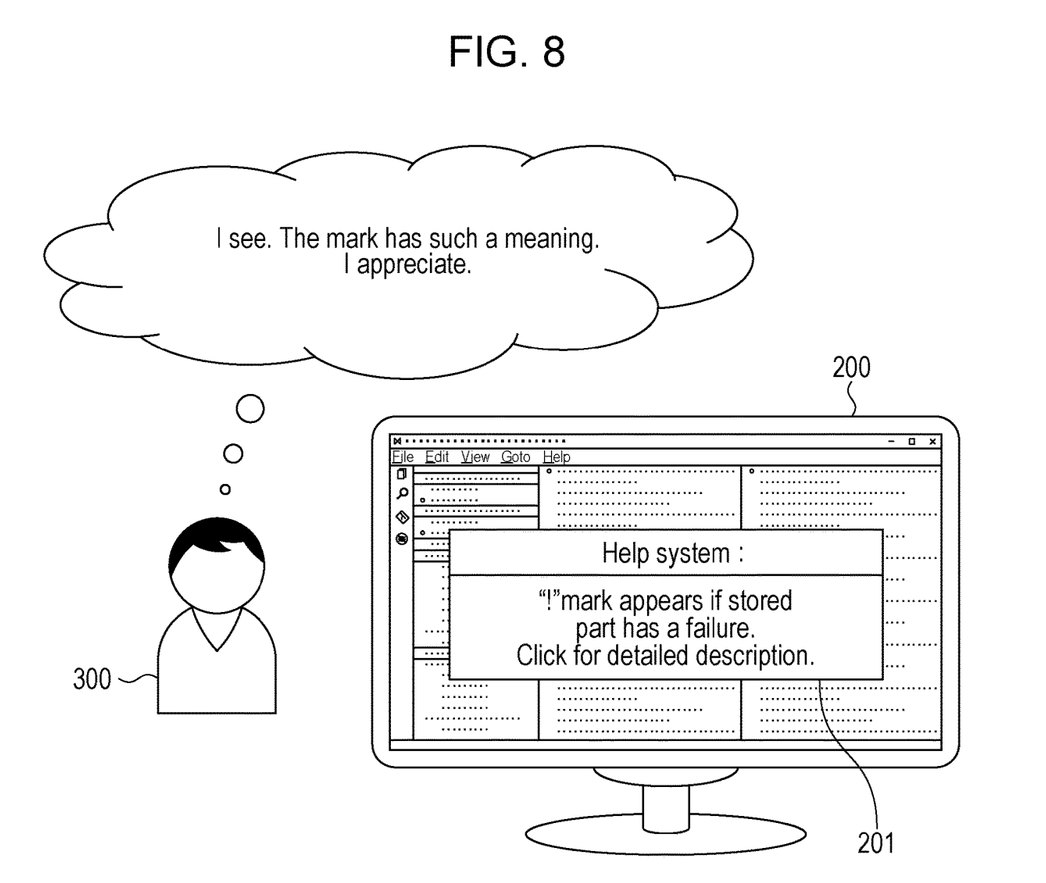
FIG. 8 is an explanatory diagram for describing another exemplary help output.

FIG. 8 is an explanatory diagram for describing another exemplary help output. For example, as illustrated in FIG. 8, the help screen 201 based on the graph G2 is displayed for the user 300 in the display unit 200. This help screen 201 is matched with the interest of the user 300 at the current time. In such a case, the user 300 performs an expected operation, such as the click operation to confirm the help screen 201. Accordingly, the information extraction apparatus 1 sets the time width H2 as the time width that will be subsequently used and is capable of providing the information matched with the interest of the user 300.

As described above, the information extraction apparatus 1 includes the time width setting unit 102 that sets the time width from the current time, which is used for the acquisition of the usage history of the user from the usage log 2. The information extraction apparatus 1 also includes the interest extracting unit 103 that extracts the interesting matter of the user in the usage history, based on the usage history acquired from the usage log 2 within the set time width. The information extraction apparatus 1 further includes the information providing unit 104 that provides information based on the extracted interesting matter to the user and acquires the result of an operation performed by the user in response to the information provision. The time width setting unit 102 sets the time width used for the acquisition of the usage history, based on the result of an operation by the user, acquired by the information providing unit 104. Since the information extraction apparatus 1 sets the time width used for the acquisition of the usage history, based on the result of an operation that is performed by the user in response to the information provision based on the extracted interesting matter, as described above, the information extraction apparatus 1 is capable of accurately extracting the interesting matter of the user, based on the acquired usage history.

The time width setting unit 102 sets a time width longer than the previous time width and determines whether the interesting matter that is extracted with the current time width being set is different from the interesting matter that is extracted with the previous time width being set. If the interesting matter that is extracted with the current time width being set is different from the interesting matter that is extracted with the previous time width being set and the result of an operation performed by the user in response to the information provision based on the different interesting matters meets a predetermined condition, the time width setting unit 102 sets the current time width as a time width that will be subsequently used. Accordingly, since the information extraction apparatus 1 sets a time width by evaluating the result of an operation, which is performed by the user in response to the information provision based on the different interesting matters, when the interesting matter extracted with the current time width is made different from the interesting matter extracted with the previous time width while setting the time widths to be sequentially increased, the information extraction apparatus 1 is capable of more accurately extracting the interesting matter of the user.

The information extraction apparatus 1 further includes the similar user determining unit 101, which determines the users having similar usage histories in the usage log 2. The time width setting unit 102 sets, for a target user for which the time width is to be set, the time width of the user the usage history of whom is determined to be similar to the usage history of the target user, based on the time width table T1. The information extraction apparatus 1 is capable of extracting the interesting matter under a condition matched with the users having similar usage histories by setting the time width matched with the users having similar usage histories in the above manner.

The interest extracting unit 103 extracts the degree of interest (the interest group probability) of each of the multiple interesting matters of the user, based on the usage history extracted from the usage log 2 within the set time width. The information providing unit 104 provides the information based on the interest group probabilities of the multiple interesting matters. Accordingly, the information extraction apparatus 1 is capable of providing the information matched with the degree of interest of each of the multiple interesting matters of the user.

The components in the respective blocks illustrated in the drawings are not necessarily physically configured in the manner illustrated in the drawings. In other words, specific aspects of dispersion and integration of the respective blocks are not limited to the ones illustrated in the drawings and all or part of them may be functionally or physically dispersed or integrated in arbitrary units depending on various loads and the usage conditions.

All or part of the various processing functions performed in the information extraction apparatus 1 may be performed on a central processing unit (CPU) (or a microcomputer, such as a micro processing unit (MPU) or a micro controller unit (MCU)). All or part of the various processing functions may be performed on programs analyzed and executed on the CPU (or the microcomputer, such as the MPU or MCU) or hardware using wired logic. The various processing functions in the information extraction apparatus 1 may be performed through cooperation of multiple computers using cloud computing.

Figure 9:
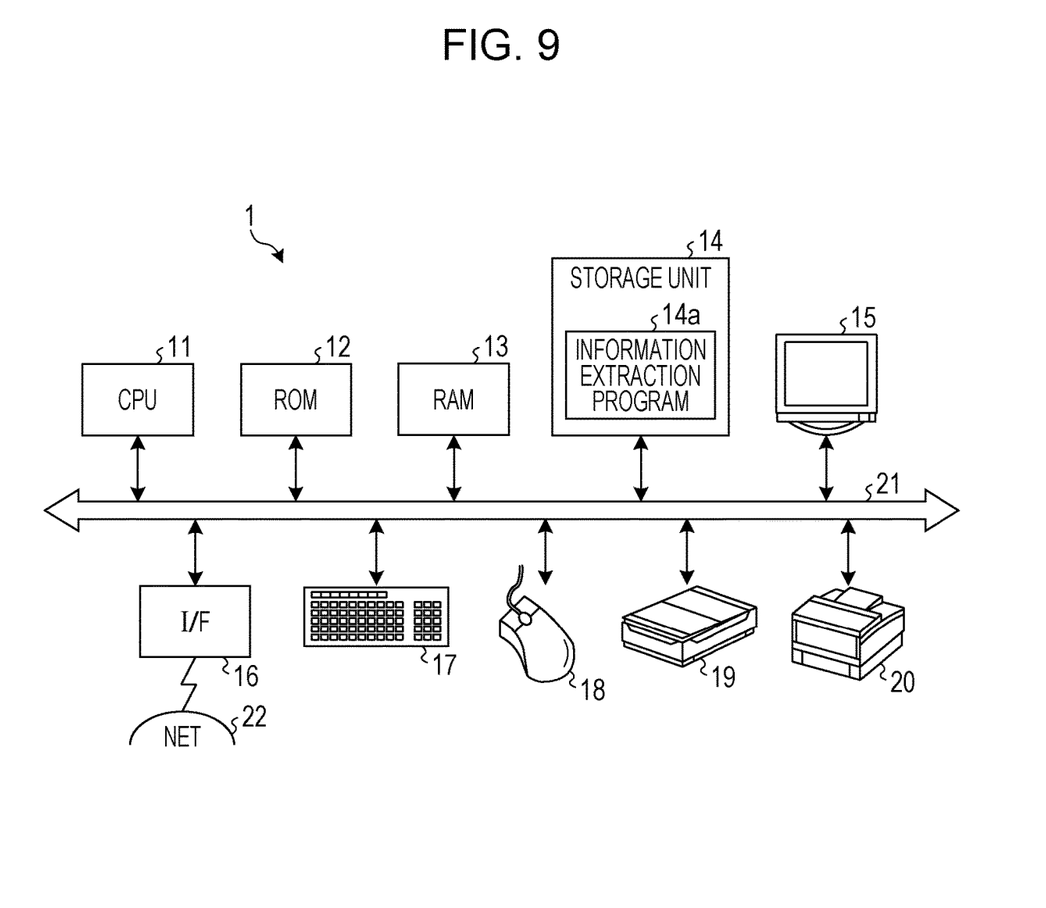
FIG. 9 is a block diagram illustrating an exemplary hardware configuration of the information extraction apparatus according to the embodiment.

The various processes described in the above embodiments may be realized by executing programs that are prepared in advance in the computer. An example of the computer (hardware) executing the programs having functions similar to those in the above embodiments will now be described. FIG. 9 is a block diagram illustrating an exemplary hardware configuration of the information extraction apparatus 1 according to the embodiment.

Referring to FIG. 9, the information extraction apparatus 1 includes a CPU 11, a read only memory (ROM) 12, a random access memory (RAM) 13, and a storage unit 14. The information extraction apparatus 1 also includes a display 15, an interface (I/F) 16, a keyboard 17, a mouse 18, a scanner 19, and a printer 20. The components (11 to 20) in the information extraction apparatus 1 are coupled to each other via a bus 21.

The CPU 11 is an arithmetic processing unit that controls the entire information extraction apparatus 1. The ROM 12 is a non-volatile memory that stores programs of the information extraction apparatus 1. The RAM 13 is a volatile memory used as a working memory in the arithmetic processing performed by the CPU 11. The storage unit 14 is, for example, a hard disk drive (HDD) and stores an information extraction program 14a and a variety of information. The variety of information stored in the storage unit 14 may include the usage log 2 described above.

The display 15 is a device that displays data, such as a document, an image, and/or functional information, concerning the result of processing. The display 15 displays, for example, a cursor, icons, or a tool box. For example, a thin film transistor (TFT) liquid crystal display, a plasma display, or an organic electroluminescent (EL) display may be used as the display 15.

The interface 16 interfaces between an network 22 and the inside of the information extraction apparatus 1 and controls input and output of data into and from an external apparatus. For example, the interface 16 is coupled to, for example, a local area network (LAN), a wide area network (WAN), or the Internet, which serves as the network 22, via a communication line and is coupled to another apparatus over the network 22. For example, a modem or a LAN adaptor may be used as the interface 16.

The functional components described above with reference to FIG. 1 are capable of being realized by the CPU 11 that executes the information extraction program 14a stored in the storage unit 14.

The information extraction program 14a may not be stored in the storage unit 14. For example, each program may be stored in a flexible disk to be loaded in the information extraction apparatus 1, that is, in a "portable physical medium", such as a floppy disk (FD), a compact disc read only memory (CD-ROM), a digital versatile disc (DVD) disk, a magneto-optical disk, or an integrated circuit (IC) card. Then, the information extraction apparatus 1 may acquire each program from the portable physical medium for execution. Alternatively, each program may be stored in another computer or a server apparatus coupled to the information extraction apparatus 1 over the network 22, such as a public switched network, the Internet, a LAN, or a WAN, and the information extraction apparatus 1 may acquire each program for execution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information extraction apparatus comprising:
  a memory; and
  a processor coupled to the memory and the processor is configured to:
  store a plurality of operations to be performed for a plurality of interesting matters;
  set, for a first user among users, a first time-width as a time-width indicating a period of time which precedes a current time and for which a usage history of each of the users is to be acquired;
  set a credibility for each of the plurality of operations;
  extract a first interesting matter of the first user from the usage history acquired within the set first time-width;
  provide help information obtained based on the extracted first interesting matter to the first user to acquire a result of an operation that is performed by the first user in response to provision of the help information; and
  calculate an interest group probability by dividing a sum of products of multiplying a total number of the plurality of operations with the credibility for each of the plurality of operations by a number of items in the usage history, wherein
  the processor sets the first time-width for the first user, based on the acquired result of the operation by the first user.

2. The information extraction apparatus of claim 1, wherein the processor is configured to:
  in a state where the first time-width is set for the first user, set, for the first user, a second time-width longer than the first time-width, and
  set the second time-width as a time-width for which the usage history of the first user is to be subsequently acquired, when a second interesting matter extracted within the second time-width is different from the first interest matter extracted within the first time-width and a result of the operation performed by the first user in response to provision of the help information obtained based on the second interesting matter meets a predetermined condition.

3. The information extraction apparatus of claim 1, wherein the processor is configured to:
  determine, for the first user, a second user among the users whose usage history is similar to the usage history of the first user, and
  set, for the first user, a second time-width set for the second user, based on setting information on time-widths set for the respective users.

4. The information extraction apparatus of claim 1, wherein the processor is configured to:
  calculate, based on the usage history, a degree of interest of each of a plurality of interesting matters for the first user, and
  provide, as the help information, information obtained based on the degree of interest of each interesting matter to the first user.

5. A non-transitory, computer-readable recording medium having stored thein a program for causing a computer to execute a process comprising:
  storing a plurality of operations to be performed for a plurality of interesting matters;
  setting, for a first user among users, a first time-width as a time-width indicating a period of time which precedes a current time and for which a usage history of each of the users is to be acquired;
  setting a credibility for each of the plurality of operations;
  extracting a first interesting matter of the first user from the usage history acquired within the set first time-width;
  providing help information obtained based on the extracted first interesting matter to the first user to acquire a result of an operation that is performed by the first user in response to provision of the help information, and
  calculating an interest group probability by dividing a sum of products of multiplying a total number of the plurality of operations with the credibility for each of the plurality of operations by a number of items in the usage history, wherein
  the first time-width for the first user is set based on the acquired result of the operation by the first user.

6. The non-transitory, computer-readable recording medium of claim 5, the process further comprising:
  in a state where the first time-width is set for the first user, setting, for the first user, a second time-width longer than the first time-width; and
  setting the second time-width as a time-width for which the usage history of the first user is to be subsequently acquired, when a second interesting matter extracted within the second time-width is different from the first interest matter extracted within the first time-width and a result of the operation performed by the first user in response to provision of the help information obtained based on the second interesting matter meets a predetermined condition.

7. The non-transitory, computer-readable recording medium of claim 5, the process further comprising:
  determining, for the first user, a second user among the users whose usage history is similar to the usage history of the first user; and
  setting, for the first user, a second time-width set for the second user, based on setting information on time-widths set for the respective users.

8. The non-transitory, computer-readable recording medium of claim 5, the process further comprising:
  calculating, based on the usage history, a degree of interest of each of a plurality of interesting matters for the first user; and
  providing, as the help information, information obtained based on the degree of interest of each interesting matter to the first user.

9. A method comprising:
  storing a plurality of operations to be performed for a plurality of interesting matters;
  setting, for a first user among users, a first time-width as a time-width indicating a period of time which precedes a current time and for which a usage history of each of the users is to be acquired;

setting a credibility for each of the plurality of operations;

extracting a first interesting matter of the first user from the usage history acquired within the set first time-width;

providing help information obtained based on the extracted first interesting matter to the first user to acquire a result of an operation that is performed by the first user in response to provision of the help information, and calculating an interest group probability by dividing a sum of products of multiplying a total number of the plurality of operations with the credibility for each of the plurality of operations by a number of items in the usage history, wherein the first time-width for the first user is set based on the acquired result of the operation by the first user.

10. The method of claim 9, further comprising:

in a state where the first time-width is set for the first user, setting, for the first user, a second time-width longer than the first time-width; and setting the second time-width as a time-width for which the usage history of the first user is to be subsequently acquired, when a second interesting matter extracted within the second time-width is different from the first interest matter extracted within the first time-width and a result of the operation performed by the first user in response to provision of the help information obtained based on the second interesting matter meets a predetermined condition.

11. The method of claim 9, further comprising:

determining, for the first user, a second user among the users whose usage history is similar to the usage history of the first user; and setting, for the first user, a second time-width set for the second user, based on setting information on time-widths set for the respective users.

12. The method of claim 9, further comprising:

calculating, based on the usage history, a degree of interest of each of a plurality of interesting matters for the first user; and providing, as the help information, information obtained based on the degree of interest of each interesting matter to the first user.

\* \* \* \* \*